US012645035B2

(12) United States Patent
Nagasaki et al.

(10) Patent No.: US 12,645,035 B2
(45) Date of Patent: Jun. 2, 2026

(54) COUPLING MEMBER, CONNECTOR COUPLING SET, OPTICAL COUPLING STRUCTURE, AND COUPLING METHOD

(71) Applicant: SUMITOMO ELECTRIC INDUSTRIES, LTD., Osaka (JP)

(72) Inventors: Taisuke Nagasaki, Osaka (JP); Takeshi Inoue, Osaka (JP); Kensaku Shimada, Osaka (JP); Toshihisa Yokochi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 316 days.

(21) Appl. No.: 18/201,810

(22) Filed: May 25, 2023

(65) Prior Publication Data

US 2023/0384531 A1 Nov. 30, 2023

(30) Foreign Application Priority Data

May 31, 2022 (JP) ................................ 2022-089007

(51) Int. Cl.
*G02B 6/38* (2006.01)

(52) U.S. Cl.
CPC ......... *G02B 6/3831* (2013.01); *G02B 6/3897* (2013.01)

(58) Field of Classification Search
CPC .................................................... G02B 6/3897
USPC ............................................................ 385/77
See application file for complete search history.

(56) References Cited

U.S. PATENT DOCUMENTS

| | | | | |
|---|---|---|---|---|
| 4,681,386 A * | 7/1987 | Boulanger | H01R 13/6275 | 439/347 |
| 5,941,730 A * | 8/1999 | Uchiyama | H01R 13/745 | 439/565 |
| 9,575,263 B2 * | 2/2017 | Gurreri | G02B 6/3806 | |
| 9,625,658 B1 * | 4/2017 | Lin | G02B 6/3879 | |
| 11,262,510 B2 * | 3/2022 | Wong | G02B 6/3887 | |
| 12,265,268 B2 * | 4/2025 | Keith | G02B 6/3882 | |
| 2006/0056774 A1 * | 3/2006 | Kim | G02B 6/4246 | 385/88 |
| 2008/0318462 A1 * | 12/2008 | Gerard | H01R 13/6272 | 439/353 |
| 2009/0004896 A1 * | 1/2009 | Gerard | H01R 13/6275 | 439/95 |
| 2014/0086541 A1 * | 3/2014 | Arao | G02B 6/4251 | 385/92 |
| 2017/0003464 A1 * | 1/2017 | Akieda | G02B 6/4284 | |
| 2017/0023749 A1 * | 1/2017 | Douma | G02B 6/4238 | |

(Continued)

FOREIGN PATENT DOCUMENTS

| | | |
|---|---|---|
| JP | 2013-140200 A | 7/2013 |
| JP | 2018-072481 A | 5/2018 |
| WO | 2013/099700 A1 | 7/2013 |

*Primary Examiner* — Kaveh C Kianni
(74) *Attorney, Agent, or Firm* — Oliff PLC

(57) ABSTRACT

A coupling member for coupling an optical component to a connector in a first direction is disclosed. The coupling member includes a locking portion that extends in a second direction intersecting the first direction, the coupling member being configured to be locked to the optical component, an elastic portion configured to press the connector toward the optical component in the first direction, and a connecting portion that connects the locking portion to the elastic portion. The elastic portion is movable outward of the connector in a planar direction defined by the first direction and the second direction.

12 Claims, 11 Drawing Sheets

(56) References Cited

U.S. PATENT DOCUMENTS

| | | | | |
|---|---|---|---|---|
| 2018/0058493 | A1* | 3/2018 | Yu | F16B 2/22 |
| 2020/0064570 | A1 | 2/2020 | Suzuki et al. | |
| 2021/0325029 | A1* | 10/2021 | Dong | F21V 17/16 |
| 2021/0332923 | A1* | 10/2021 | Han | F16L 43/008 |
| 2022/0283388 | A1* | 9/2022 | Nagasaki | G02B 6/4284 |
| 2023/0130045 | A1* | 4/2023 | Taha | G02B 6/423<br>385/88 |
| 2024/0165825 | A1* | 5/2024 | Zhang | B25J 15/0253 |

* cited by examiner

COUPLING MEMBER, CONNECTOR COUPLING SET, OPTICAL COUPLING STRUCTURE, AND COUPLING METHOD

CROSS-REFERENCE TO RELATED APPLICATION

This application claims the benefit of priority from Japanese Patent Application No. 2022-089007, filed on May 31, 2022, the entire contents of which are incorporated herein by reference.

TECHNICAL FIELD

The present disclosure relates to a coupling member, a connector coupling set, an optical coupling structure, and a coupling method.

BACKGROUND

JP2013-140200A discloses an optical module having a configuration in which a connector component that holds a plurality of optical fibers is coupled to a lens array component.

SUMMARY

As one aspect, the present disclosure provides a coupling member for coupling a connector to an optical component in a first direction. The coupling member includes a locking portion that extends in a second direction intersecting the first direction, the locking portion being configured to be locked to the optical component, an elastic portion configured to press the connector toward the optical component in the first direction, and a connecting portion that connects the locking portion to the elastic portion. The elastic portion is movable outward of the connector in a planar direction defined by the first direction and the second direction.

DETAILED DESCRIPTION

Figure 1:
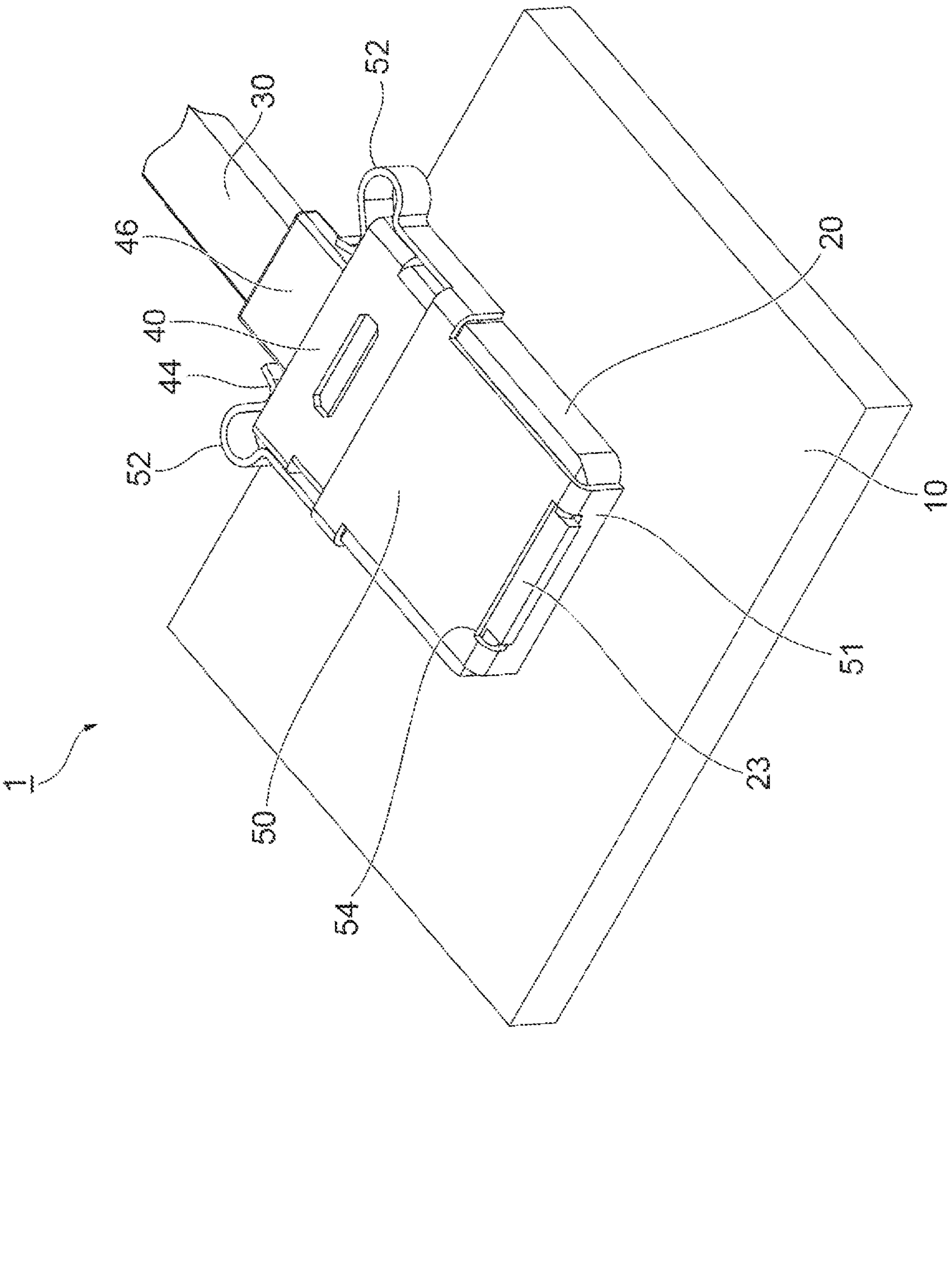
FIG. 1 is a perspective view illustrating an optical coupling structure according to a first embodiment.

Problems to be Solved by the Present Disclosure

In the optical module disclosed in JP2013-140200A, a coupling state between the connector component and the lens array component is maintained by a fitting spring having a flat plate and two pairs of engaging walls that extend perpendicularly from both ends of the flat plate. When the fitting spring is fitted to the coupled body composed of the connector component and the lens array component, it is necessary to attach the two pairs of engaging walls, that is, four engaging walls, to the coupled body substantially simultaneously. Thus, such attaching can be cumbersome work.

Effects of the Present Disclosure

According to the present disclosure, a coupling member can be easily attached to the coupled body of a connector and an optical component.

DESCRIPTION OF EMBODIMENTS OF THE PRESENT DISCLOSURE

First, the contents of the embodiments of the present disclosure will be listed and described. A coupling member according to an embodiment of the present disclosure is a coupling member for coupling a connector to an optical component in a first direction. The coupling member includes a locking portion that extends in a second direction intersecting the first direction, the locking portion being configured to be locked to the optical component, an elastic portion configured to press the connector toward the optical component in the first direction, and a connecting portion that connects the locking portion to the elastic portion. The elastic portion is movable outward of the connector in a planar direction defined by the first direction and the second direction.

In the coupling member described above, the elastic portion that presses the connector is movable toward outside of the connector in the planar direction defined by the first direction and the second direction. In this embodiment, an operation region, for example, an elastic deformation region, of the elastic portion is secured in the planar direction defined by the first direction and the second direction. According to the coupling member, it is possible to secure a wider operation region of the elastic portion than in a case in which the operation region of the elastic portion is secured in a height direction of the connector or the like. Therefore, the coupling member can be easily attached to a coupled body of the connector and the optical component.

In the coupling member described above, the elastic portion may have a side surface portion connected to one end of the connecting portion, the side surface portion being configured to be disposed outside a side surface of the connector, a protruding portion configured to come into contact with a rear end surface of the connector, and an elasticity applying portion connected to the side surface portion, the elasticity applying portion being configured to apply an elastic force that presses the connector toward the optical component to the protruding portion. Thus, the elastic portion of the coupling member can be more reliably fitted to the connector.

In the coupling member described above, at least a portion of the elasticity applying portion may have a curved surface, and the curved surface may be formed to be away from the connector. Thus, a desired elastic force can be ensured without enlarging the operation region to that extent.

In the coupling member described above, the side surface portion may include a first side surface portion and a second side surface portion each of which extends linearly in the first direction, and the first side surface portion and the second side surface portion may be configured to sandwich the connector between the first side surface portion and the second side surface portion when the coupling member is attached to the connector. Thus, it is possible to prevent a widthwise misalignment in the coupling between the connector and the optical component.

In the coupling member described above, the side surface portion includes a first side surface portion and a second side surface portion each of which is provided with a portion that protrudes outward of the connector and a portion that comes into contact with the connector, and the first side surface portion and the second side surface portion may be configured to sandwich the connector between the first side surface portion and the second side surface portion when the coupling member is attached to the connector. Thus, it is possible to prevent widthwise misalignment in the coupling between the connector and the optical component and to further widen the operation region of the elastic portion, thereby making the attaching work of the coupling member easier.

In the coupling member described above, the side surface portion may be configured to swing outward of the connector with a portion that is connected to the connecting portion as a point of origin. Thus, the attaching work of the coupling member can be facilitated.

In the coupling member described above, the locking portion may include a surface shape that comes into surface contact with a rear end surface of the optical component, and the locking portion may be provided with at least one of an opening and a protrusion that is a structure to be locked to the optical component. Thus, attaching of the coupling member to the optical component can be simplified. In addition, since less force is applied to the optical component when the coupling member is attached to the optical component, it is possible to prevent the optical component from being separated when the optical component is mounted on a substrate or the like.

In the coupling member described above, the connecting portion may include a flat plate that extends in the first direction and the second direction and may be configured to cover at least a part of the optical component with the flat plate when the coupling member is attached to the optical component. Thus, it is possible to curb deterioration of the optical characteristics of the optical coupling structure caused by foreign matter adhering to a region (for example, a mirror surface or a lens surface) in the optical component to which the foreign matter should not adhere.

A connector coupling set according to an embodiment of the present disclosure includes any one of the coupling members described above and a connector that holds at least one optical fiber. According to such a connector coupling set, as described above, the coupling member can be easily attached to the coupled body of the connector and the optical component.

An optical coupling structure according to an embodiment of the present disclosure includes any one of the coupling members described above, a connector that holds at least one optical fiber, and an optical component coupled to the connector. According to such an optical coupling structure, it is possible to easily attach the coupling member to the coupled body of the connector and the optical component in the same manner as described above.

A method according to an embodiment of the present disclosure is a method of coupling a connector to an optical component. The method includes preparing an optical component and a connector, preparing any one of the coupling members described above, coupling the connector to the optical component, applying the inner side of the locking portion of the coupling member to a rear end of the optical component, and fitting the elastic portion to the connector while the elastic portion is widened toward outside of the connector. According to the coupling method, similarly to the above, the coupling member can be easily attached to the coupled body of the connector and the optical component.

Details of Embodiment of the Present Disclosure

Specific examples of embodiments of the present disclosure will be described below with reference to the drawings. The present invention is not limited to the examples, but is indicated by the scope of the claims, and is intended to include all modifications within the meaning and scope of equivalents to the scope of the claims. In the description of the drawings, the same elements are denoted by the same reference numerals, and overlapping descriptions will be omitted.

First Embodiment

Figure 2:
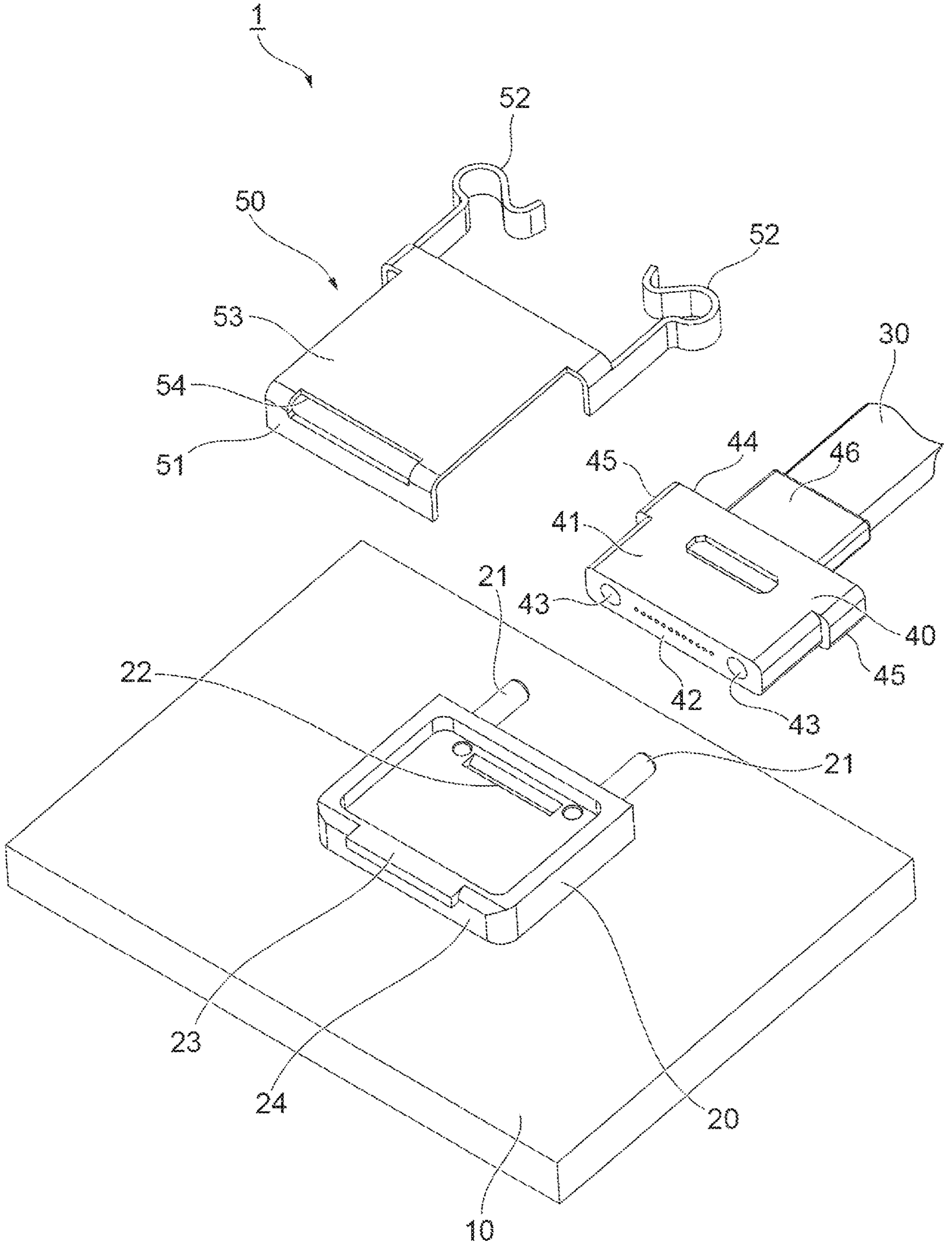
FIG. 2 is an exploded perspective view of the optical coupling structure shown in FIG. 1.

FIGS. 1 and 2 are perspective views illustrating an optical coupling structure according to the first embodiment. As shown in FIGS. 1 and 2, the optical coupling structure 1 includes a lens module 20 (an optical component) mounted on a substrate 10, a ribbon fiber cable 30 including a plurality of optical fibers, a connector 40 that holds each of the optical fibers of the ribbon fiber cable 30, a boot 46 attached to the connector 40, and a coupling member 50 that maintains a state in which the connector 40 is coupled to the lens module 20. In such an optical coupling structure 1, the connector 40 that holds the ribbon fiber cable 30 is moved to the lens module 20 in a coupling direction A (first direction) and coupled to the lens module 20 (refer to FIGS. 5A to 5D).

The lens module 20 is an optical component configured to be optically coupled to a tip end of each of the optical fibers of the ribbon fiber cable 30 held by the connector 40. The lens module 20 receives an optical signal transmitted by each of the optical fibers of the ribbon fiber cable 30 and causes a light receiving element (not shown) provided on the substrate 10 to receive the optical signal. When a light emitting element (not shown) is provided on the substrate 10, the lens module 20 inputs an optical signal from the light emitting element to each of the optical fibers of the ribbon fiber cable 30.

The lens module 20 includes a pair of guide pins 21, a mirror surface 22, a rear end protrusion 23 and a rear end surface 24. Optical coupling between the connector 40 and the lens module 20 is aligned by inserting the pair of guide pins 21 into a pair of guide holes 43 of the connector 40. The mirror surface 22 is an optical structure for reflecting the optical signal received from each of the optical fibers of the ribbon fiber cable 30 and propagating in the coupling direction A by 90 degrees toward the light receiving element mounted on the substrate 10. When a light emitting element is provided on the substrate 10, the mirror surface 22 reflects the optical signal propagating in a vertical direction from the light emitting element toward the connector 40 by 90 degrees.

The rear end protrusion 23 is a protrusion that protrudes from a rear end of the lens module 20. The rear end protrusion 23 is a locking structure for being inserted into an opening 54 of the coupling member 50, which will be described later in detail, and locking the coupling member 50 to the lens module 20. The rear end surface 24 is an end surface located at the rear end of the lens module 20. The rear end surface 24 is a surface parallel to a surface perpendicular to the coupling direction A, and comes into surface contact with an inner surface of a locking portion 51 of the coupling member 50 when the coupling member 50 is attached to the lens module 20.

The ribbon fiber cable 30 is an optical fiber member in which a plurality of optical fibers extending in the coupling direction A are disposed in order in a width direction perpendicular to the coupling direction A and are entirely covered with a coating resin or the like. Although the number of optical fibers included in the ribbon fiber cable 30 is not particularly limited, it may be twelve, eighteen, or twenty-four, for example. The ribbon fiber cable 30 is configured so that a tip end portion of each of the optical fibers is inserted and held into the connector 40, and a tip end surface thereof is exposed from a front end surface 42 of the connector 40.

The connector 40 is an optical component that holds each of the optical fibers of the ribbon fiber cable 30 and is configured to be coupled to the lens module 20 in the coupling direction A. The connector 40 is, for example, an MT connector. The connector 40 includes a connector main body 41, a front end surface 42, a pair of guide holes 43 and a rear end surface 44. The connector main body 41 is a resin member having a substantially rectangular parallelepiped shape. The connector main body 41 is provided with an inner space from the rear end surface 44 toward the front end surface 42, and is configured so that the tip end of each of the optical fibers of the ribbon fiber cable 30 inserted from the rear end surface 44 is exposed from the front end surface 42.

The guide holes 43 are positioning holes provided to sandwich the optical fibers exposed on the front end surface 42 and extends inside the connector main body 41 in the coupling direction A. When the connector 40 is coupled to the lens module 20, the connector 40 is positioned relative to the lens module 20 by inserting the pair of guide pins 21 of the lens module 20 into the pair of guide holes 43. The rear end surface 44 is an end surface located at the rear end of the connector 40 and is a surface parallel to a plane orthogonal to the coupling direction A. When the coupling member 50 is attached to the connector 40, a pair of elastic portions 52 of the coupling member 50 come into contact with the rear end surface 44, and the pair of elastic portions 52 press the connector 40 toward the lens module 20.

Figure 3:
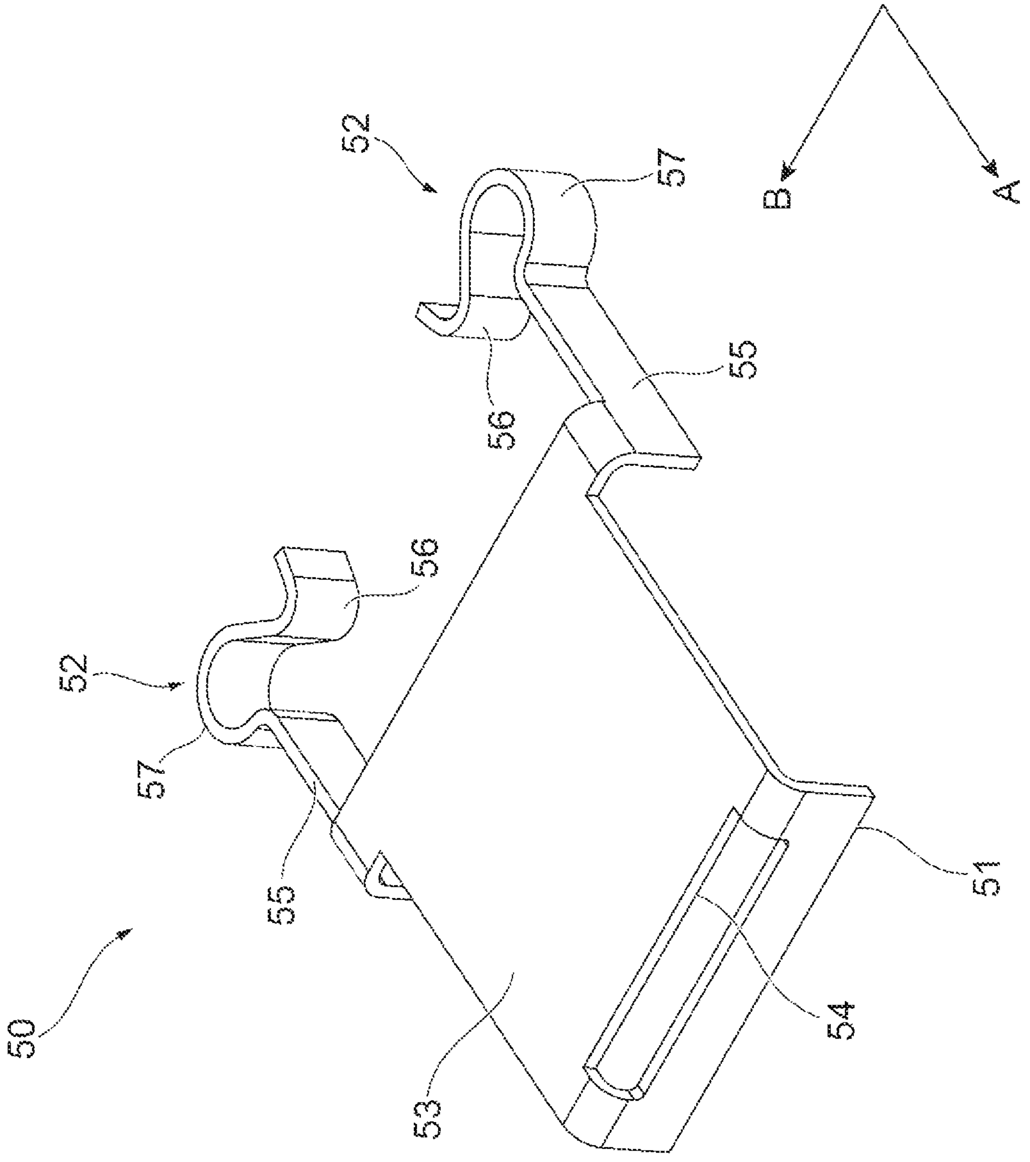
FIG. 3 is a perspective view illustrating a coupling member used in the optical coupling structure shown in FIG. 1.

The coupling member 50 is a member that maintains a coupled state between the connector 40 and the lens module 20 when the connector 40 is coupled to (inserted into) the lens module 20. The coupling member 50 is configured to maintain the coupled state (refer to FIG. 4) such that the rear end of the connector 40 and the rear end of the lens module 20 are sandwiched and the connector 40 is pressed against the lens module 20. FIG. 3 is a perspective view of the coupling member when seen from above.

The coupling member 50 includes a locking portion 51, a pair of elastic portions 52, and a connecting portion 53, as shown in FIG. 3. The coupling member 50 is made of a metal, for example, but may be made of other materials such as a resin. The pair of elastic portions 52 are connected to respective corners of a tip end of the connecting portion 53, and are configured to be able to swing (move) outward of the connector 40 on a horizontal plane with the connected portions as points of origin. The locking portion 51 has a surface extending in a width direction B orthogonal to the coupling direction A, and is configured to be locked (in surface contact) with the rear end surface 24 of the lens module 20. The locking portion 51 is provided with an opening 54 in a coupling region with the connecting portion 53. The opening 54 extends in the width direction B. The connecting portion 53 is a plate-like portion that connects the locking portion 51 to the pair of elastic portions 52.

Figure 4:
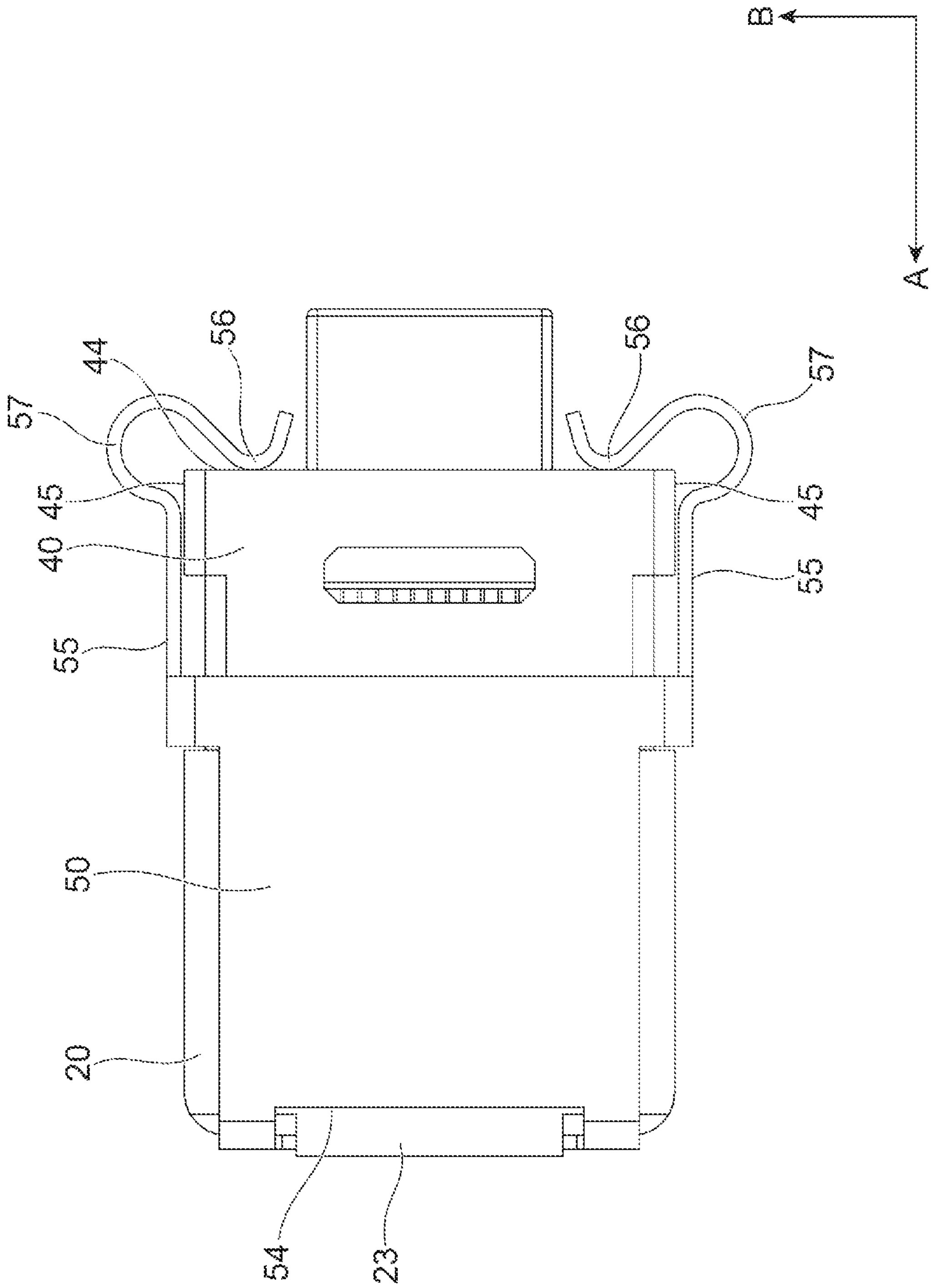
FIG. 4 is a top view illustrating the optical coupling structure shown in FIG. 1.

Each of the elastic portions 52 includes a side surface portion 55 (a first side surface portion, a second side surface portion), a protruding portion 56, and an elasticity applying portion 57. A pair of side surface portions 55 are straight portions that extend in the coupling direction A from both corner portions of one end of the connecting portion 53 near the connector 40. The pair of side surface portions 55 are disposed outside side surfaces 45 of the connector 40, as shown in FIG. 4. The pair of side surface portions 55 may be formed to provide a predetermined clearance with each of the facing side surfaces 45. The protruding portion 56 is a curved portion that protrudes toward the locking portion 51. The protruding portion 56 comes into contact with the rear end surface 44 of the connector 40 and presses it toward the lens module 20 when the coupling member 50 is attached to the connector 40 (refer to FIG. 4). The elasticity applying portion 57 is connected to the side surface portion 55 and the protruding portion 56, and applies an elastic force for pressing the connector 40 toward the lens module 20 to the protruding portion 56. The elasticity applying portion 57 is, for example, a curved portion that is formed to describe a circle from a tip end of the side surface portion 55 toward the outside, and a curved shape thereof generates an elastic force.

Figure 7:
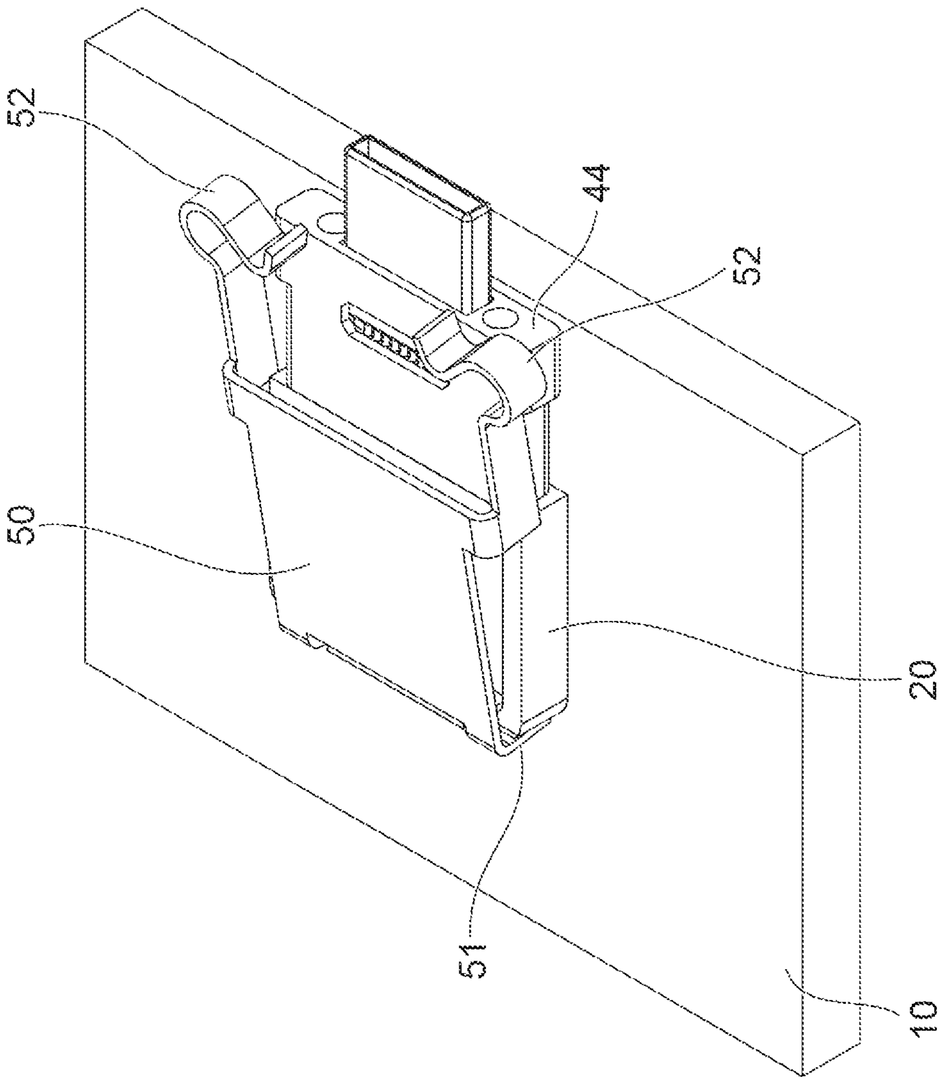
FIG. 7 is a perspective view illustrating a state in which a coupling member is fitted to a coupled body in which the connector is coupled to the lens module.
Figure 8:
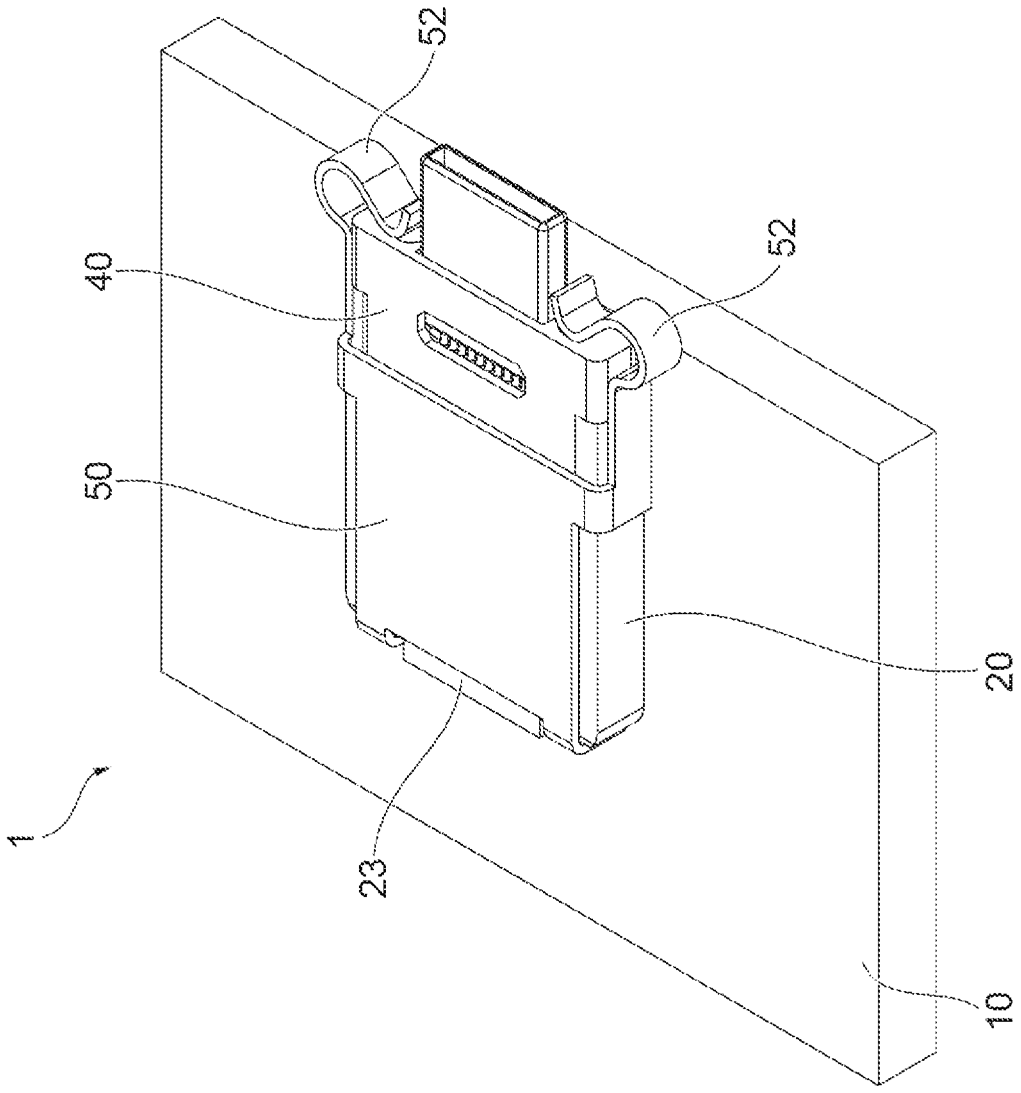
FIG. 8 is a perspective view illustrating a state after the coupling member is fitted to the coupled body shown in FIG. 7.

Here, a method of coupling the connector 40 holding the ribbon fiber cable 30 to the lens module 20 will be described with reference to FIGS. 5A to 8. FIGS. 5A to 5D are side views sequentially illustrating a coupling method for coupling the connector 40 to the lens module 20. FIG. 6 is a perspective view illustrating a state before the connector 40 is coupled to the lens module 20. FIG. 7 is a perspective view illustrating a state in which the coupling member 50 is fitted to a coupled body in which the connector 40 is coupled to the lens module 20. FIG. 8 is a perspective view illustrating a state after the coupling member 50 is fitted to the coupled body shown in FIG. 7.

Figure 5A:
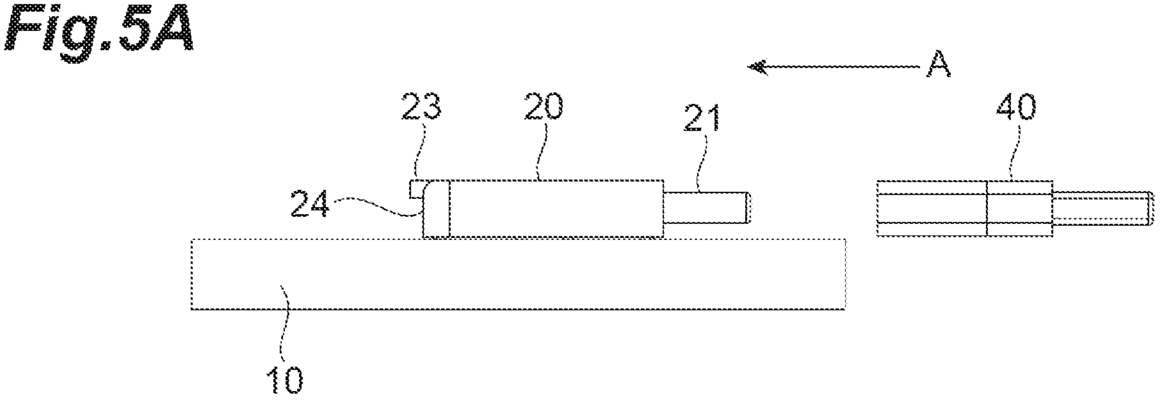
FIGS. 5A to 5D are side views sequentially illustrating a method of coupling a connector to a lens module.
Figure 5B:
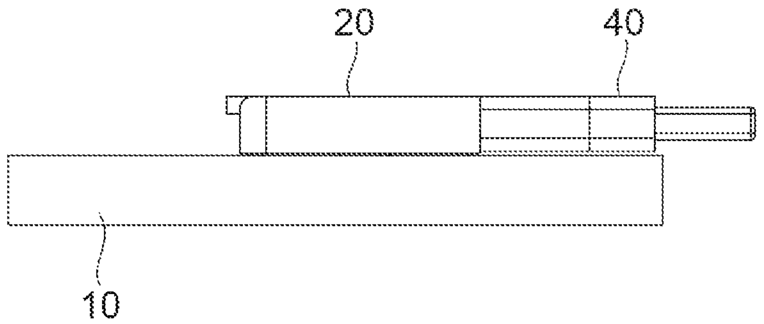
Figure 5C:
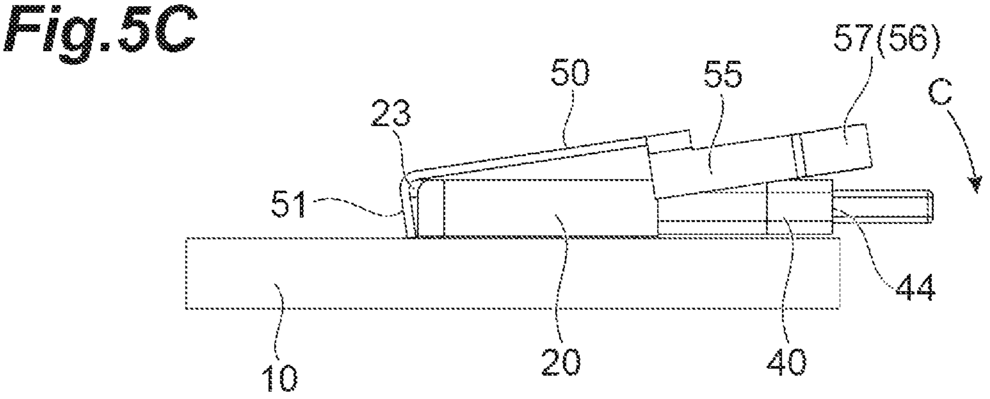
Figure 5D:
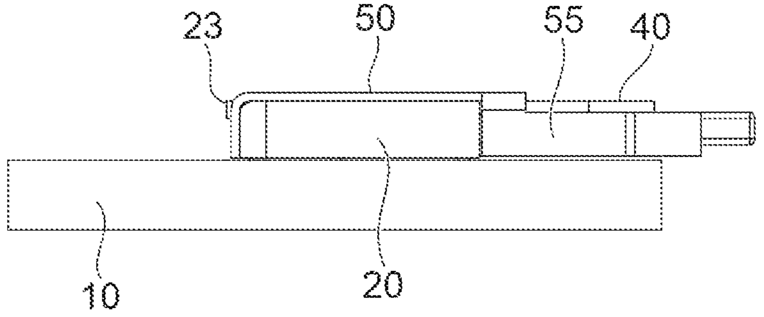
Figure 6:
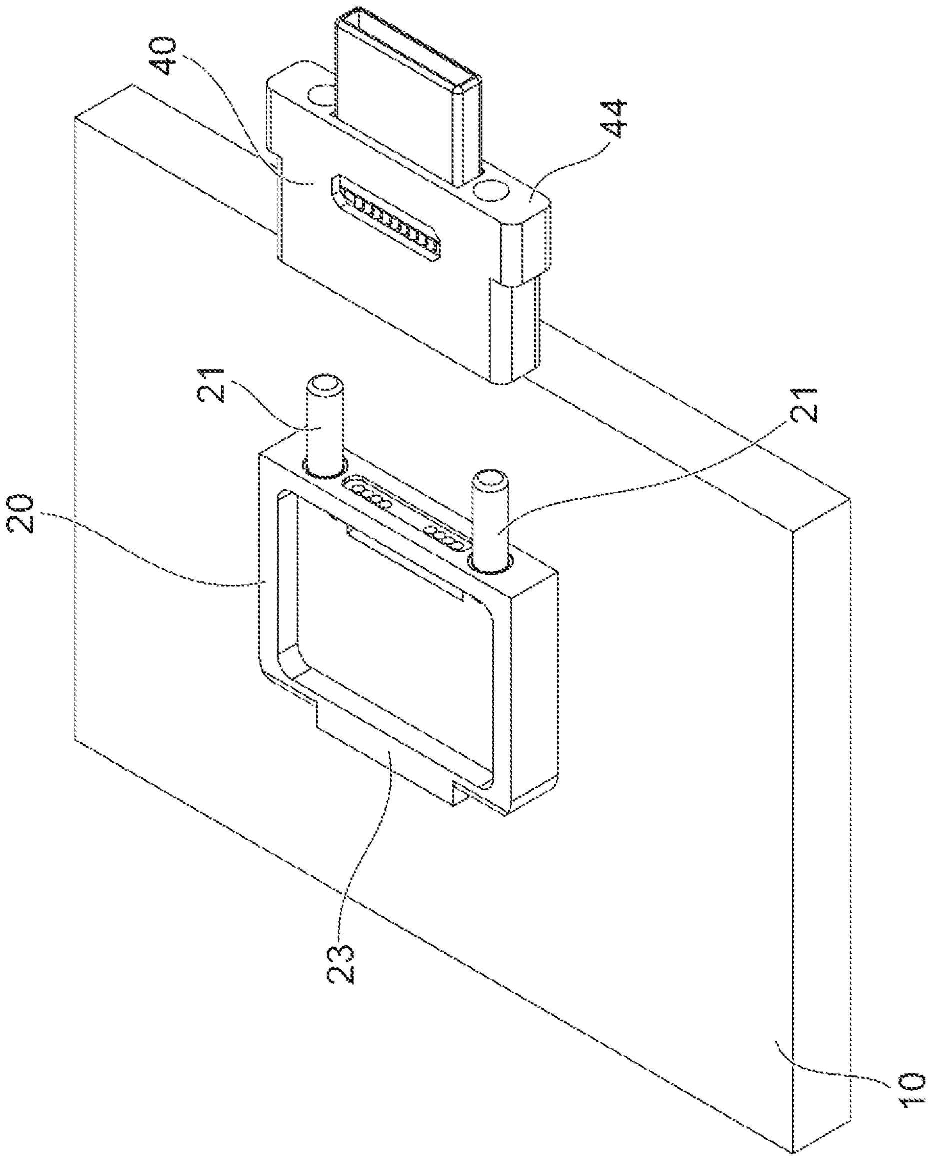
FIG. 6 is a perspective view illustrating a state before the connector is coupled to the lens module.

As shown in FIG. 5A, the lens module 20 mounted on the substrate 10 and the connector 40 holding the ribbon fiber cable 30 are prepared (refer to also FIG. 6). In FIGS. 5A to 5D and 6, illustration of the ribbon fiber cable 30 will be omitted. Also, the coupling member 50 for maintaining the coupled state between the lens module 20 and the connector 40 is prepared.

Subsequently, when the above preparation is completed, the connector 40 is moved in the coupling direction A toward the lens module 20 mounted on the substrate 10 in order to couple the connector 40 to the lens module 20. Then, the guide pins 21 of the lens module 20 are inserted into the guide holes 43 of the connector 40, so that the lens module 20 and the connector 40 are in the coupled state as shown in FIG. 5B.

Subsequently, when the connector 40 is coupled to the lens module 20, as shown in FIGS. 5C and 7, the coupling member 50 is attached to the lens module 20 so that the locking portion 51 is locked to the rear end (the rear end surface 24) of the lens module 20. At this time, the rear end protrusion 23 of the lens module 20 is inserted into the opening 54 of the coupling member 50. Also, a partial inner surface of the locking portion 51 of the coupling member 50 comes into contact with the rear end surface 24 of the lens module 20. Thus, the coupling member 50 is positioned with respect to the lens module 20. At this point, the protruding portion 56 of the coupling member 50 located on the opposite side is located above the rear end surface 44 of the connector 40 and is in a state before contact.

Subsequently, when the coupling member 50 is temporarily fixed to the lens module 20, the elastic portion 52 of the coupling member 50 is pushed in a direction of an arrow C toward the substrate 10. Thus, as shown in FIGS. 5D and 8, the coupling member 50 is fitted to the coupled body of the lens module 20 and the connector 40.

As described above, in the optical coupling structure 1 including the coupling member 50 according to the present embodiment, the elastic portion 52 that presses the connector 40 is movable outward of the connector 40 in a planar direction defined by the coupling direction A and the width direction B. In this case, an operation region, for example, an elastic deformation region, of the elastic portion 52 is secured in the planar direction defined by the coupling direction A and the width direction B. According to the coupling member 50, a wide operation region for the elastic portion 52 can be secured compared to a case in which the operation region for the elastic portion is secured in a height direction of the connector 40 or the like. Therefore, according to the optical coupling structure 1 having the coupling member 50, the coupling member 50 can be easily attached to the coupled body of the connector 40 and the lens module 20.

In the optical coupling structure 1, each of the elastic portions 52 has the side surface portion 55 that is connected to one end of the connecting portion 53 and is configured to support the connector 40 from the side surface, the protruding portion 56 configured to come into contact with the rear end surface 44 of the connector 40, and the elasticity applying portion 57 that is connected to the side surface portion 55 and is configured to apply an elastic force for pressing the connector 40 toward the lens module 20 to the protruding portion 56. Thus, each elastic portion 52 of the coupling member 50 can be fitted to the connector 40 more reliably.

In the optical coupling structure 1, the elasticity applying portion 57 has a curved surface at least in part, and the curved surface is formed away from the connector 40. Thus, a desired elastic force can be ensured without enlarging the operation region of the elastic portion 52 in the coupling member 50 to that extent.

In the optical coupling structure 1, the coupling member 50 includes a pair of side surface portions 55 each of which extends linearly in the coupling direction A, and the pair of side surface portions 55 are configured to sandwich the connector 40 between the pair of side surface portions 55 when the coupling member 50 is attached to the connector 40. Thus, it is possible to prevent the widthwise misalignment in the coupling between the connector 40 and the lens module 20.

In the optical coupling structure 1, each of the side surface portions 55 of the coupling member 50 can swing outward of the connector 40 with a portion that is connected to the connecting portion 53 as a point of origin. Thus, the attaching work of the coupling member 50 can be facilitated.

In the optical coupling structure 1, the locking portion 51 of the coupling member 50 has a surface shape that comes into surface contact with the rear end surface 24 of the lens module 20, and an opening 54 that is a structure for locking to the lens module 20 is provided in the locking portion 51. Thus, the attaching of the coupling member 50 in the lens module 20 can be simplified. Further, in this case, since less force is applied to the lens module 20 when the coupling member 50 is attached to the lens module 20, it is possible to prevent the lens module from being separated from the substrate 10.

In the optical coupling structure 1, the connecting portion 53 of the coupling member 50 includes a flat plate that extends in the coupling direction A and the width direction B, and when the coupling member 50 is attached to the lens module 20, the flat plate may cover the mirror surface 22 of the lens module 20 and the like. Thus, the deterioration of the optical characteristics of the optical coupling structure 1 due to foreign matter adhering to a region (for example, a mirror surface or a lens surface) in the lens module 20 to which the foreign matter should not adhere can be curbed.

The coupling method according to the present embodiment is a method of coupling the connector 40 to the lens module 20, including a step of preparing the lens module 20 and the connector 40, a step of preparing the coupling member 50, and a step of coupling the connector 40 to the lens module 20, a step of applying the inner side of the locking portion 51 of the coupling member 50 to the rear end of the lens module 20, and a step of fitting the elastic portion 52 to the connector 40 while the elastic portion 52 is widened toward outside of the connector 40. According to such a coupling method, it is possible to easily attach the coupling member in the coupled body of the connector 40 and the lens module 20 in the same manner as described above. Moreover, according to the coupling method, the coupling member 50 can be easily attached and thus, deformation of the coupling member 50 can be curbed.

Second Embodiment

Figure 9:
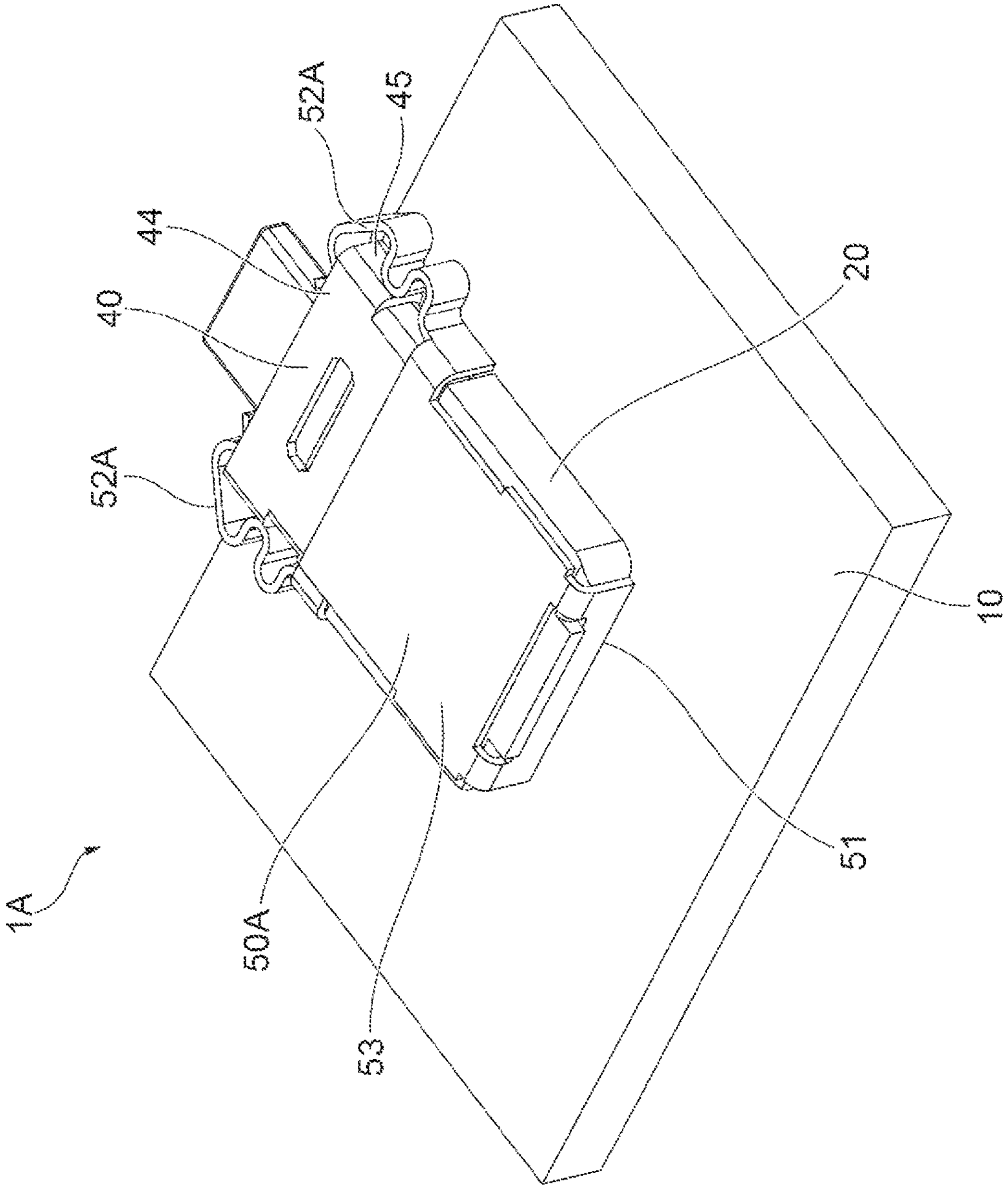
FIG. 9 is a perspective view illustrating an optical coupling structure according to a second embodiment.
Figure 10:
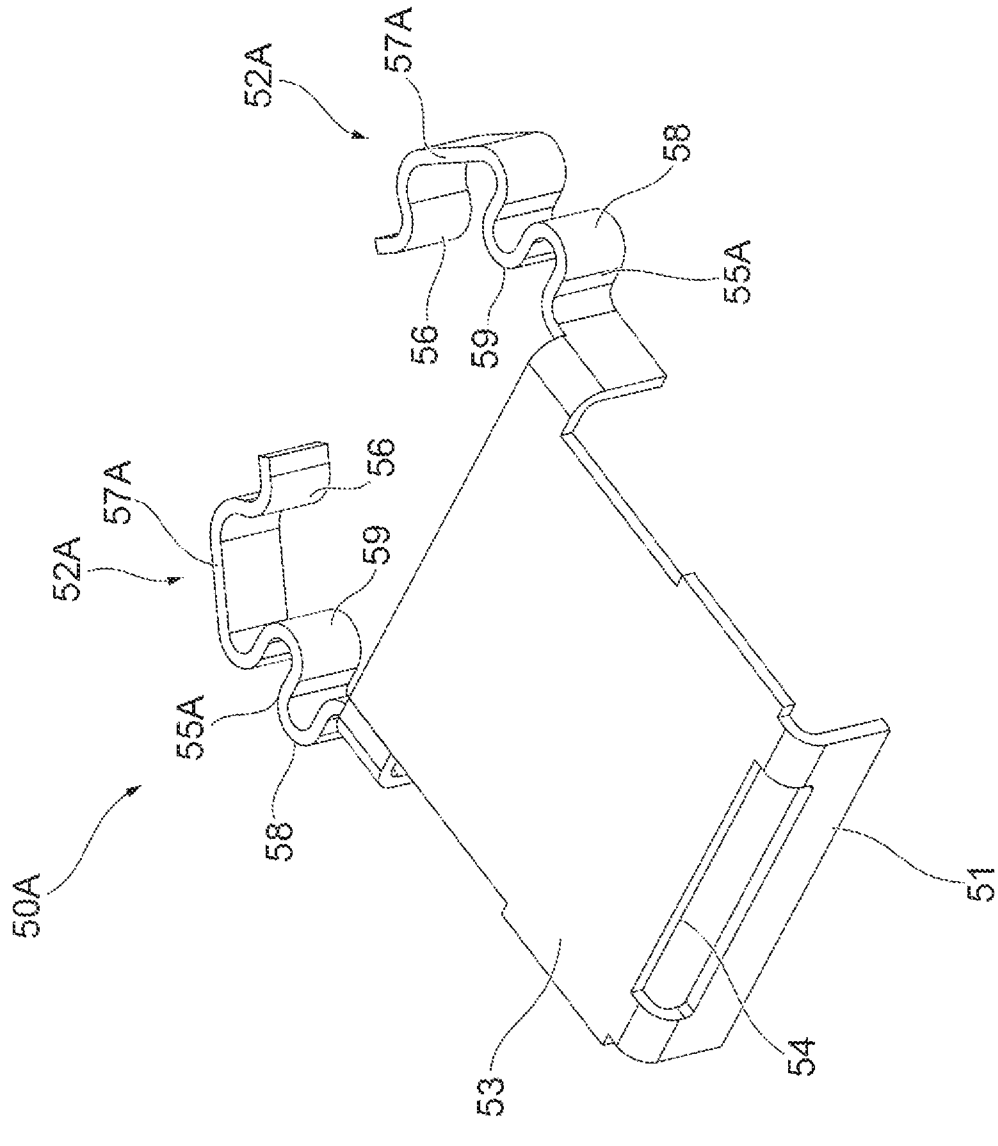
FIG. 10 is a perspective view illustrating a coupling member used in an optical coupling structure shown in FIG. 9.
Figure 11:
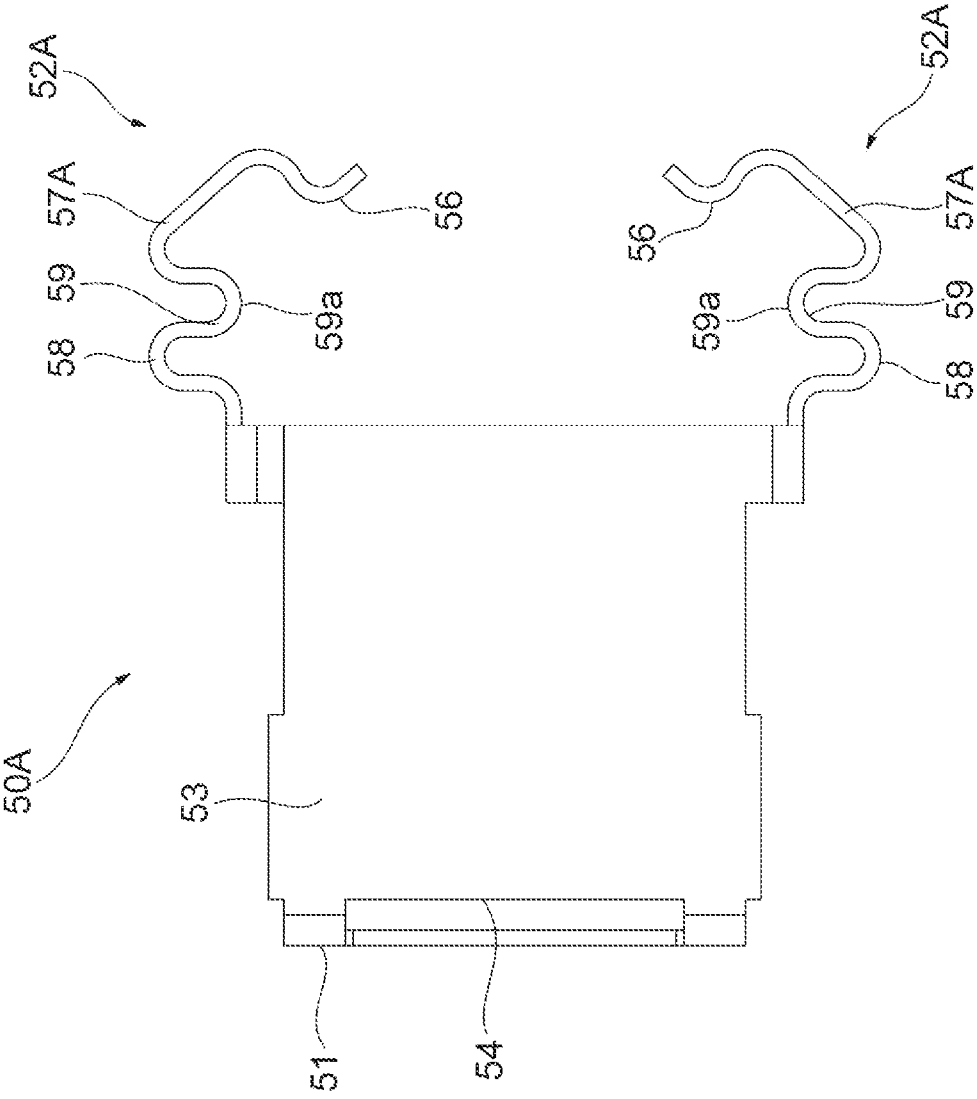
FIG. 11 is a top view of the coupling member shown in FIG. 10.

Next, an optical coupling structure according to a second embodiment will be described with reference to FIGS. 9, 10 and 11. FIG. 9 is a perspective view illustrating the optical coupling structure according to the second embodiment. FIG. 10 is a perspective view illustrating a coupling member used in the optical coupling structure shown in FIG. 9. FIG. 11 is a top view of the coupling member shown in FIG. 10. In the following description, differences from the optical coupling structure 1 according to the first embodiment are mainly described, and other descriptions may be omitted.

As shown in FIG. 9, an optical coupling structure 1A includes the lens module 20, the ribbon fiber cable 30, the connector 40, and a coupling member 50A. In the optical coupling structure 1A according to the second embodiment, the coupling member 50A used is different from that in the first embodiment.

The coupling member 50A has the locking portion 51, a pair of elastic portions 52A, and the connecting portion 53, as shown in FIGS. 10 and 11. Each of the pair of elastic portions 52A includes a side surface portion 55A (a first side surface portion and a second side surface portion), the protruding portion 56, and an elasticity applying portion 57A. The pair of side surface portions 55A extend from both corner portions of one end of the connecting portion 53 near the connector 40 and are connected to each of the elasticity applying portions 57A. A curved surface portion 58 that protrudes toward the outside of the connector 40 and a support portion 59 that comes into contact with the connector 40 are provided on each of the side surface portions 55A. The curved surface portion 58 is a portion that protrudes outward from the connector 40 and has a function of complementing the elastic force. The support portion 59 is a portion that is coupled to one end of the curved surface portion 58 and protrudes toward the connector 40. A protruding end 59*a* of the support portion 59 comes into contact with the side surface of the connector 40 to support the connector 40. Like the elasticity applying portion 57 of the first embodiment, the elasticity applying portion 57A is configured so that an elastic force which presses the connector 40 toward the lens module 20 is applied to the protruding portion 56. The elasticity applying portion 57A has a shape different from that of the elasticity applying portion 57, and includes a curved surface portion and a linear surface portion.

As described above, according to the optical coupling structure 1A according to the second embodiment, the same effects as those of the optical coupling structure 1 according to the first embodiment can be obtained. Furthermore, the optical coupling structure 1A includes a pair of side surface portions 55A each of which has a curved portion 58 that protrudes toward the outside of the connector 40 and a support portion 59 that comes into contact with the connector 40. The pair of side surface portions 55A sandwich the connector 40 between the pair of side surface portions 55A when the coupling member 50A is attached to the connector 40. Thus, in addition to being able to prevent the misalignment in the coupling between the connector 40 and the lens module 20 in the width direction, the attaching work of the coupling member 50A can be made easier by further widening the operation region of the elastic portion 52A (supplementing the elastic force). In addition, it is possible to realize more reliable fitting.

Although the embodiments of the present disclosure have been described in detail above, the present invention is not limited to the above embodiments and can be applied to various embodiments. For example, in the above embodiments, a lens module was exemplified as an optical component coupled to a connector, but the invention is not limited thereto. For example, another connector (for example, another MT connector) may be used as an optical component coupled to the connector 40. Also, although the MT connector is exemplified as the connector 40, other types of connectors may be used. In addition, the coupling member 50 is locked to the lens module 20 by the rear end protrusion 23 entering the opening 54 of the locking portion 51, but a protrusion may be provided inside the locking portion 51, and a recessed portion for receiving the protrusion may be provided at the rear end of the lens module 20 for locking.

What is claimed is:

1. A coupling member for coupling a connector to an optical component in a first direction, comprising:
- a locking portion that extends in a second direction intersecting the first direction, the locking portion being configured to be locked to the optical component;
- an elastic portion configured to press the connector toward the optical component in the first direction; and
- a connecting portion that connects the locking portion to the elastic portion, wherein
- the elastic portion is movable outward of the connector in a planar direction defined by the first direction and the second direction;
- the elastic portion includes
  - a side surface portion connected to one end of the connecting portion, the side surface portion being configured to be disposed outside a side surface of the connector;
  - a protruding portion configured to come into contact with a rear end surface of the connector; and
  - an elasticity applying portion connected to the side surface portion, the elasticity applying portion being configured to apply an elastic force that presses the connector toward the optical component to the protruding portion.

2. The coupling member according to claim 1, wherein at least a portion of the elasticity applying portion has a curved surface, and the curved surface is formed to be away from the connector.

3. The coupling member according to claim 1, wherein:
- the side surface portion includes a first side surface portion and a second side surface portion each of which extends linearly in the first direction; and
- the first side surface portion and the second side surface portion are configured to sandwich the connector between the first side surface portion and the second side surface portion when the coupling member is attached to the connector.

4. The coupling member according to claim 1, wherein:
- the side surface portion includes a first side surface portion and a second side surface portion each of which is provided with a portion that protrudes outward of the connector and a portion that comes into contact with the connector; and
- the first side surface portion and the second side surface portion are configured to sandwich the connector between the first side surface portion and the second side surface portion when the coupling member is attached to the connector.

5. The coupling member according to claim 1, wherein the side surface portion is configured to swing outward of the connector with a portion that is connected to the connecting portion as a point of origin.

6. The coupling member according to claim 1, wherein:
- the locking portion includes a surface shape that comes into surface contact with a rear end surface of the optical component; and
- the locking portion is provided with at least one of an opening and a protrusion that is a structure to be locked to the optical component.

7. The coupling member according to claim 1, wherein the connecting portion includes a flat plate that extends in the first direction and the second direction, and is configured to cover at least a part of the optical component with the flat plate when the coupling member is attached to the optical component.

8. A connector coupling set comprising:
- the coupling member according to claim 1; and
- a connector configured to hold at least one optical fiber.

9. An optical coupling structure comprising:
- the coupling member according to claim 1;
- a connector configured to hold at least one optical fiber; and
- an optical component coupled to the connector.

10. A method of coupling a connector to an optical component, comprising:
- preparing an optical component and a connector;
- preparing the coupling member according to claim 1;
- coupling the connector to the optical component;

applying an inner side of the locking portion of the coupling member to a rear end of the optical component; and fitting the elastic portion to the connector while the elastic portion is widened toward outside of the connector.

11. A coupling member for coupling a connector to an optical component in a first direction, comprising:

a locking portion that extends in a second direction intersecting the first direction, the locking portion being configured to be locked to the optical component;

an elastic portion configured to press the connector toward the optical component in the first direction; and a connecting portion that connects the locking portion to the elastic portion, wherein the elastic portion is movable outward of the connector in a planar direction defined by the first direction and the second direction, the locking portion includes a surface shape that comes into surface contact with a rear end surface of the optical component; and the locking portion is provided with at least one of an opening and a protrusion that is a structure to be locked to the optical component.

12. A method of coupling a connector to an optical component, comprising:

preparing an optical component and a connector;

preparing a coupling member configured to couple the connector to the optical component in a first direction, the coupling member comprising:

a locking portion that extends in a second direction intersecting the first direction, the locking portion being configured to be locked to the optical component;

an elastic portion configured to press the connector toward the optical component in the first direction; and a connecting portion that connects the locking portion to the elastic portion, wherein the elastic portion is movable outward of the connector in a planar direction defined by the first direction and the second direction;

coupling the connector to the optical component;

applying an inner side of the locking portion of the coupling member to a rear end of the optical component; and fitting the elastic portion to the connector while the elastic portion is widened toward outside of the connector.

* * * * *